Oct. 17, 1933.   C. F. BURDETT ET AL   1,930,582
APPARATUS FOR CUTTING GLASS SHEETS
Filed Aug. 16, 1930   4 Sheets-Sheet 2
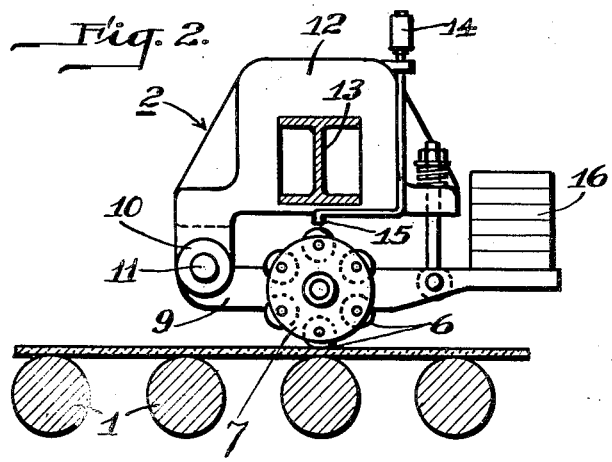
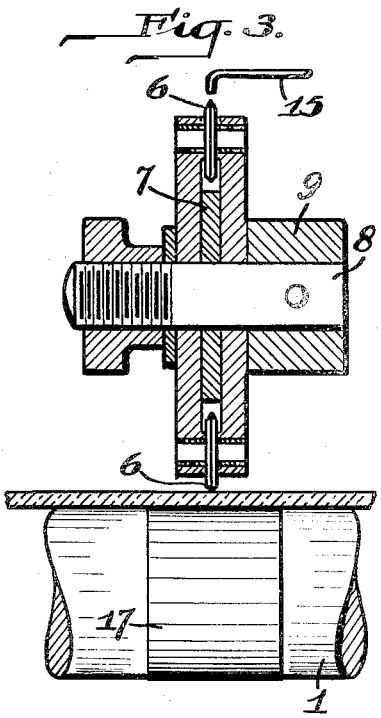
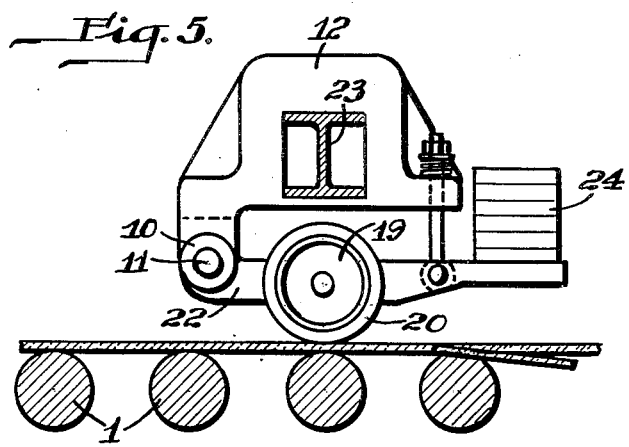
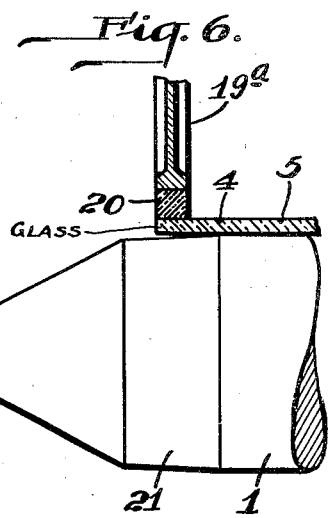
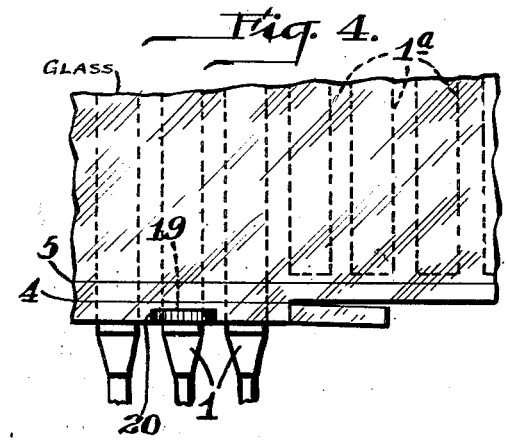
INVENTOR
Clarence F Burdett
and
Wm Owen
by
James L Bradley Oct. 17, 1933.　　　C. F. BURDETT ET AL　　　1,930,582
APPARATUS FOR CUTTING GLASS SHEETS
Filed Aug. 16, 1930　　　4 Sheets-Sheet 3
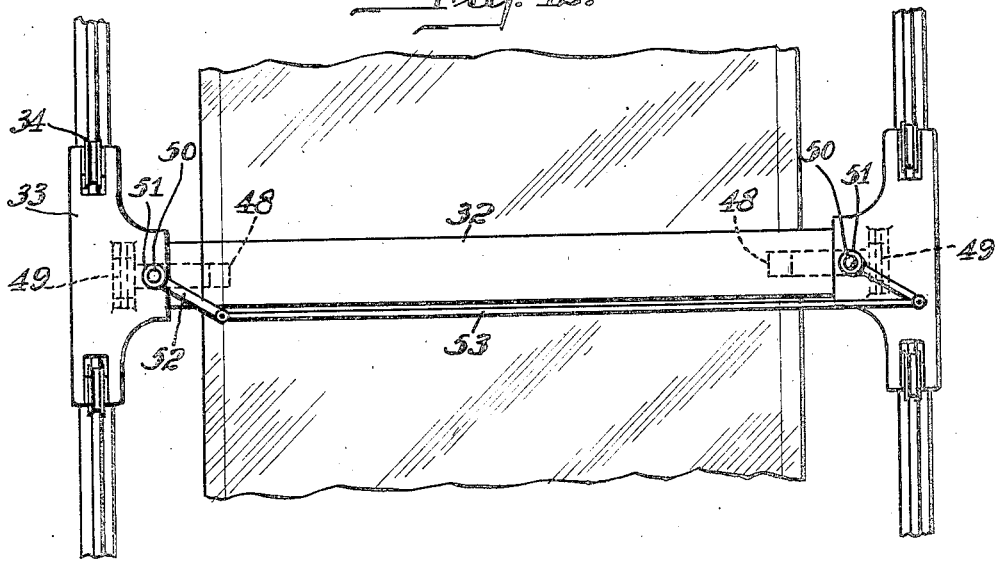
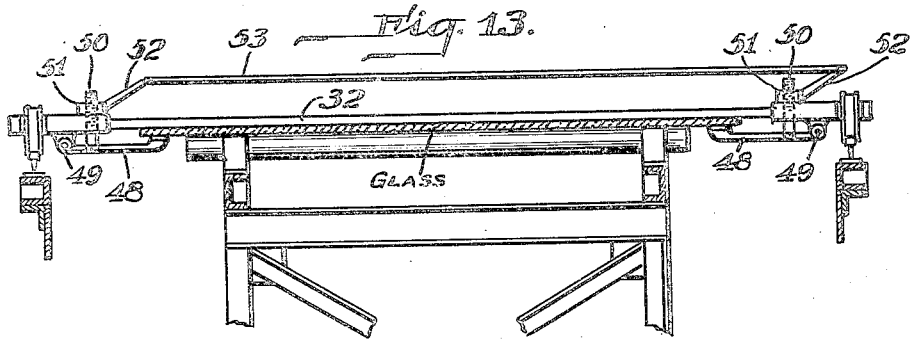
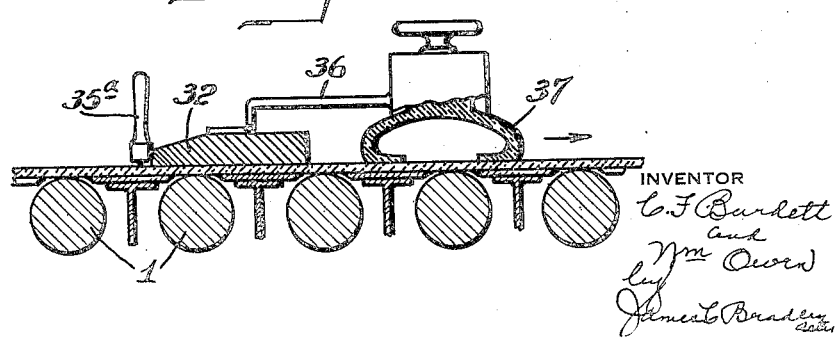

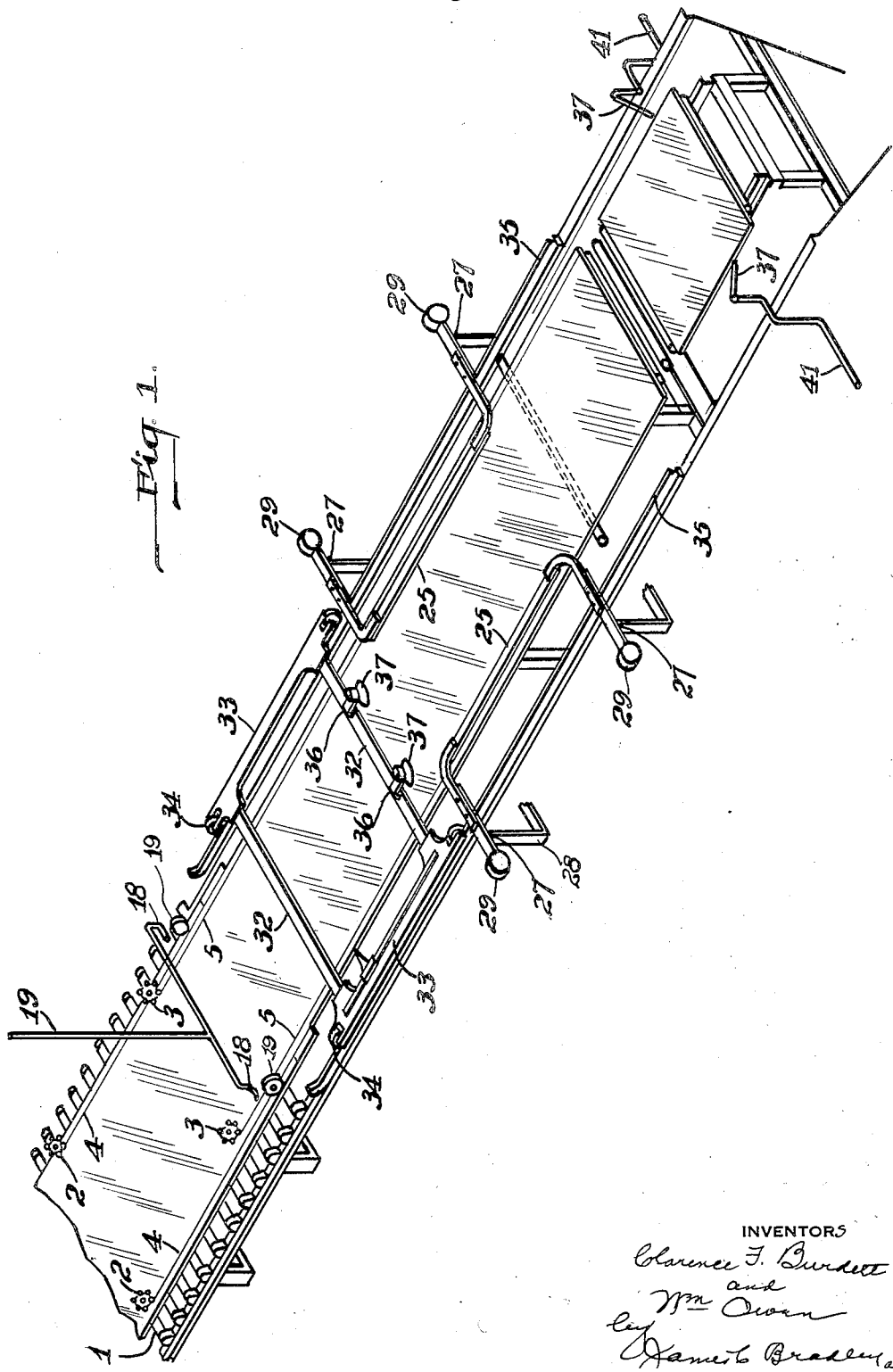

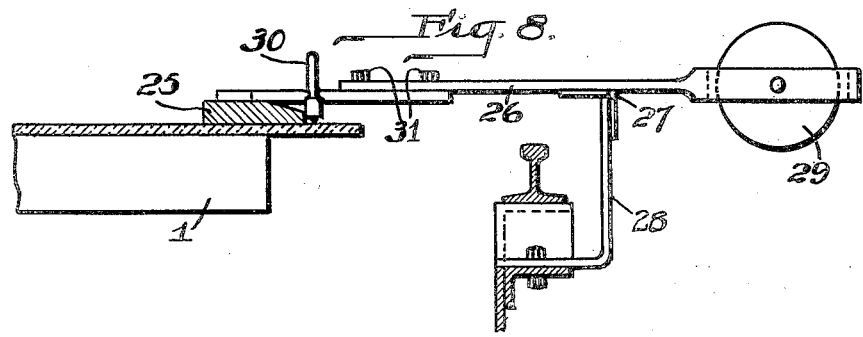
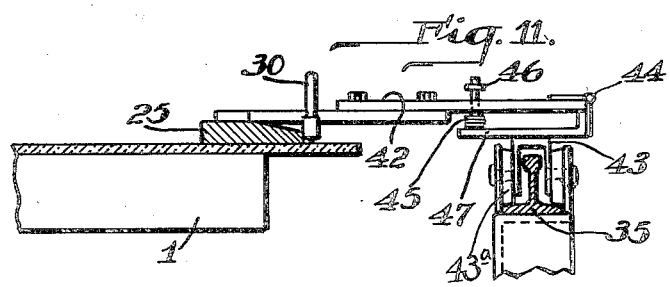
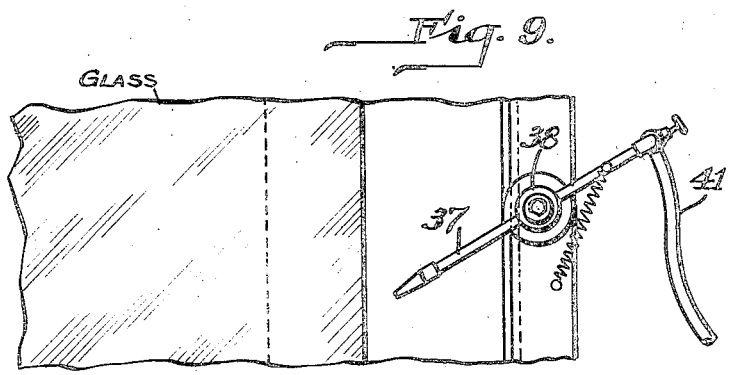
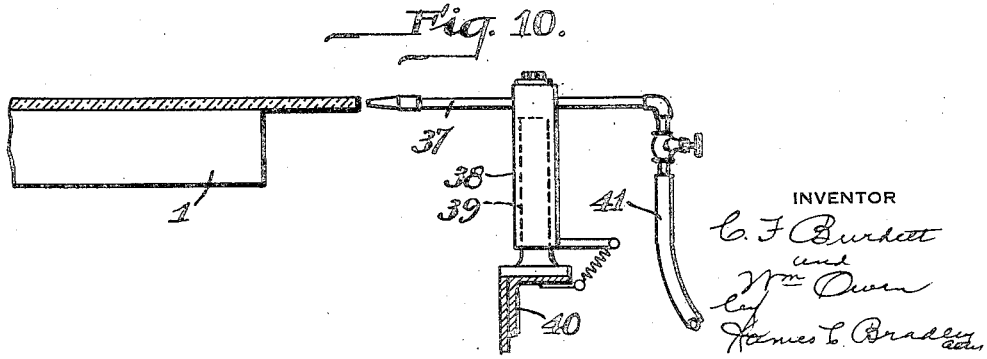

Patented Oct. 17, 1933

1,930,582

UNITED STATES PATENT OFFICE 1,930,582

APPARATUS FOR CUTTING GLASS SHEETS

Clarence Frederick Burdett, Ford City, and William Owen, Pittsburgh, Pa., assignors to Pittsburgh Plate Glass Company, a corporation of Pennsylvania Application August 16, 1930. Serial No. 475,788

7 Claims. (Cl. 49—48)

The invention relates to an apparatus for trimming off the edges of a glass sheet and cutting it transversely. The glass sheet may be a continuous one formed from a tank, or it may be one formed by an intermittent casting operation, such as that formed by the Showers process and apparatus set forth in Patents Nos. 1,603,989 and 1,579,666. The glass thus formed passes through a roller leer and out upon a roller runway where the somewhat irregular side edges are trimmed off and the sheet cut into lengths suitable for handling. The invention has for its objects the provision of an improved apparatus for automatically removing the edges of the sheet, thus reducing the hand labor to a minimum. A still further object of the invention is the provision of an improved edge trimming frame normally out of the way, but available for use in case the automatic cutting means fails to function. Certain embodiments are illustrated in the accompanying drawings, wherein:

Figure 1 is a diagrammatic perspective view showing the runway at the outlet end of a leer equipped with the improvements hereinafter described. Figs. 2 and 3 are details of the edge scoring devices, Fig. 2 being a side elevation, and Fig. 3 a vertical section. Figs. 4, 5 and 6 are detail views illustrating the means employed for automatically cracking off the edge of the sheet after it is scored, Fig. 4 being a diagrammatic plan view, Fig. 5 being a side elevation, and Fig. 6 being a section at right angles to the view of Fig. 5. Fig. 7 is an enlarged detail section showing the means for securing the cross cutting frame to the sheet of glass so that the frame is moved along with the glass during the cutting operation. Fig. 8 is a detail sectional view showing the method for mounting the straight edge used for trimming the edges of the sheet. Figs. 9 and 10 are detail views of the edge cleaning means, Fig. 9 being a plan view and Fig. 10 being a vertical section. Fig. 11 is a detail view showing a modified means for supporting the straight edge at the side of the sheet. Figs. 12 and 13 are detail views showing a modified means for securing the cross cutting frame to the forwardly moving glass sheet, Fig. 12 being a plan view, and Fig. 13 a vertical section.

Fig. 1 illustrates in a diagrammatic way the cutting equipment as applied to the runway at the outlet end of a roller leer, such runway consisting of a series of suitably driven rolls 1 adapted to receive the glass sheets as they emerge from the leer and carry them continuously forward. Adjacent the side edges of the glass sheets and mounted upon fixed supports, not shown in Fig. 1, are two sets of edge scoring devices 2, 2, and 3, 3. These edge scoring devices are shown in detail in Figs. 2 and 3 and serve to score the glass at each edge along two lines 4 and 5, the line 4 being at about 1½ inches from the edge of the sheet and the line 5 being at about 1½ inches from the line 4, so that about 3 inches is trimmed from each edge of the sheet. The final edge of the sheet along the line 5 is much smoother when the glass is cut in this way than is the case where only a single cut is taken. The edge glass is very hard and under considerable strain and some of this strain is relieved when the first cut is made along the line 4, so that when the second cut is made along the line 5, the tendency of the glass to splinter and separate in an irregular way is reduced. The two sets of cutters 2, 2 and 3, 3 each shown as removed from each other a considerable distance longitudinally of the runway, but this is merely a matter of convenience as they may be placed close together if desired. The cutters employed are wheels 6 (Fig. 3) of hardened metal and of relatively large diameter as compared with the wheel of an ordinary cutter as otherwise the period of use of the wheel possibly would be very short due to the hardness of the glass at the edge and its rough surface. Six wheels are mounted in the circular holder 7 so that after one wheel is worn out another one may be very readily brought into position. The holder 7 is mounted upon a shaft 8 carried by the arm 9 and such arm 9 is pivoted to a bracket 10, as indicated in Fig. 2. The bracket 10 is swivelled on the bolt 11 carried by the frame 12, and such frame 12 is mounted upon a transverse beam 13 supported in any suitable manner transversely of the runway. A fluid for facilitating cutting, such as kerosene, is carried by the cup 14 from which a pipe 15 conducts the liquid to the cutting wheels. The cutting wheel 6 is positioned directly over the center line of one of the runway rolls 1, as indicated in Fig. 3, so that the glass is well supported at a point opposite the line of pressure exercised by the wheel 6. This pressure is very considerable and the arrangement specified tends to reduce breakage. The amount of pressure is regulated by the counterweights 16 carried by the arm 9 and in order to still further reduce any tendency toward breakage a cushioning means is provided on the roll, preferably in the form of a strip of cloth 17 secured around the roll. Both sets of cutters 2, 2 and 3, 3 are constructed and arranged as just described. Just in advance of the cutters 3, 3 are the jet members 18, to which air under pressure is supplied from the pipe 19. These jets are directed against the surface of the glass opposite the lines of cuts 5, 5 and serve to blow away any chips which accumulate on the surface of the glass incident to the cutting operations.

Means are provided for automatically breaking off the strips of glass lying outward of the lines 4, 4, such means comprising a pair of wheels 19, 19 and a cooperating structure shown in detail in Figs. 4, 5 and 6. As here shown, the wheel 19 is provided with a flexible tire 20 which engages the edge of the sheet outward from the line 4 (Fig. 6). The rolls 1 beneath the glass at this point are beveled, as indicated at 21, so that the edge of the sheet to which pressure is applied by the roll 19 is unsupported and will, therefore, readily crack off along the line 4 if sufficient pressure is applied. The means for carrying the rolls 19, 19 is similar to that for carrying the cutter wheels heretofore described. The roll 19 is mounted upon an arm 22 carried by the transverse beam 23 in the manner heretofore described in connection with the cutting wheels, suitable pressure being applied by means of the counterweights 24 carried by the right hand end of the arm 22. As indicated in Fig. 4, the ends of the rolls 1a in advance of the rolls 1 are cut away so that room is provided for the edges of the glass to drop down after they are cracked off by the wheels 19. A suitable receptacle (not shown) is provided along the side of the runway at this point in order to receive the broken off edges. The edges of the sheet outward from the lines of scoring 5, 5 may also be cracked off automatically, if desired, but are preferably cracked off by operators who are required at the outlet end of the leer for other purposes, this being done by the hands or by pinchers which are applied to grip the edge of the sheet and crack it off along the line 5.

In some cases, the edges may not crack off satisfactorily for short periods and in such cases it is desirable to re-score the edges by hand. Provision is made for guiding the cutting tools in this hand operation in the form of the straight edges 25, 25 shown in Figs. 1 and 8. These straight edges are carried by arms 26, 26 pivotally supported at 27 on brackets 28 attached to the side framing of the runway. These arms 26 are counterweighted by the members 29 so that normally the straight edges 25 lie above the surface of the glass. When it is necessary to use them, however, they are pressed down against the glass and the operator uses the hand tool 30 equipped with a diamond or cutting wheel to score the glass. The arms 26 are preferably made in two parts secured together by the bolts 31 extending through slots in one of the arms so that the position of the straight edge may be adjusted in and out to any desired position.

Mounted for movement longitudinally of the runway above the glass is a cross cutting frame made up of the straight edges 32, 32 and the side members 33, 33. The members 33, 33 are provided with wheels 34 which ride upon a track 35 so that the cross cutting frame may be moved to any desired position along the runway. The glass may be cut by means of the hand tool 35a along the inner side of either of the straight edges 32 (Fig. 7), the operator standing upon the glass sheet in order to perform the cutting operation. The forward straight edge 32 is provided with a pair of brackets 36 carrying the vacuum cups 37 which are adapted to engage the surface of the glass sheet therebeneath and secure the straight edge to the glass so that during the cutting operation the frame will move along with the glass. If these clamping devices are not used, the necessary movement of the frame is secured by another operator pressing down one of the straight edges so that it frictionally engages the sheet and causes the frame to move along with the glass. The use of the vacuum cups relieves the second operator of this attitude.

Figs. 9 and 10 illustrate the mounting of the air jets 37, 37 which are located adjacent the forward end of the runway, such air jets being directed against the edges of the sheets. The members 37, 37 are mounted in sleeves 38 carried by the pivots 39 secured to the frame members 40. Air under pressure is supplied from the pipes 41. Means are thus provided for cleaning the edges of the sheets of any chips or small particles of glass.

Fig. 11 illustrates a modification of the method of mounting the straight edges 25, 25 in that the arms 42 which carry the straight edge are secured at their outer ends to brackets 43 carrying the rollers 43a which fit over the rails 35, thus permitting the straight edge to be shifted to different positions longitudinally of the runway. The arms 42 in this case are pivoted at 44 to the brackets 43 and are normally held out of engagement with the glass by means of springs 45 on bolts 46 secured at their lower ends to the plate 47 and extending through slots in the arms 42.

In the construction shown in Figs. 12 and 13, a modified form of device is shown for clamping the cross cutting frame to the glass to take the place of the vacuum cups 37. This clamping device comprises a pair of arms 48 pivoted at 49 to the under side of the straight edge 32. These arms are adapted to engage the under side of the glass sheet adjacent its edges and clamp such sheet against the lower side of the straight edge. In order to move the arms upward, they are provided with a pair of screw members 50 having a relatively steep pitch, such members extending through the straight edge and having threaded upon their upper ends the nuts 51 provided with the handles 52, such handles being connected by means of the rod 53. By swinging the rod 53 to rotate the nuts, the arms may be moved to clamped or unclamped position. When the cutter is ready to score the glass behind the straight edge 32, he moves the rod 53 so as to cause the arms 48 to clamp the sheet against the straight edge, the parts being left in this position until the sheet is scored. The rod 53 is thus moved in the reverse direction to release the clamping arms. This is a more positive means for securing the cross frame to the glass than the vacuum cups 37 and is preferred in those cases where the sheet is relatively rough on its upper surface and makes the vacuum cups difficult of attachment.

What we claim is:

1. In combination with a roller runway for carrying forward a glass sheet, edge trimming means comprising a fixed scoring tool adjacent the edge of the sheet in substantially vertical alignment with the axis of one of the rollers of the runway whose glass supporting surface extends outward as far as the cutter, and cushioning means carried by said roller opposite the tool.

2. In combination with a roller runway for carrying forward a glass sheet, edge trimming means comprising a fixed scoring tool adjacent the edge of the sheet in substantially vertical alignment with the axis of one of the rollers of the runway whose glass supporting surface extends outward as far as the cutter, and a strip of yielding material around said roller to give a cushioning effect in opposition to the tool.

3. In combination in apparatus for removing the side edge of a glass sheet, a runway for the sheet adapted to carry it forward, a straight edge above the runway and parallel to the line of movement thereof adjacent the edge of the sheet, means for supporting the straight edge for vertical movement so that in one position it lies out of contact with the glass and in another position it engages the glass, and means for normally holding the straight edge out of contact with the glass.

4. In combination in apparatus for removing the side edge of a glass sheet, a runway for the sheet adapted to carry it forward, a straight edge above the runway and parallel to the line of movement thereof adjacent the edge of the sheet, and pivotally supported for movement toward and from the glass sheet, and counterweight means for normally holding it away from the glass.

5. In combination in apparatus for removing the side edge of a glass sheet, a runway for the sheet adapted to carry it forward, a straight edge above the runway and parallel to the line of movement thereof adjacent the edge of the sheet, means for supporting the straight edge for movement longitudinally of the runway and also for vertical movement so that in one position it lies out of contact with the glass and in another position it engages the glass, and means for normally holding the straight edge out of contact with the glass.

6. In combination with a roller runway for carrying forward a glass sheet, edge trimming means comprising a fixed scoring tool adjacent the edge of the sheet, means for cracking off the edge of the sheet comprising a roll with a yielding periphery engaging the edge of the sheet outward from the line of scoring, and means applying pressure continuously thereon to cause the sheet to crack along the line of scoring, the runway roller in opposition to the cutter being formed in cone shape from the line of scoring outward to leave the scored edge of the sheet unsupported.

7. In combination with a roller runway for carrying forward a glass sheet, edge trimming means comprising a fixed scoring tool adjacent the edge of the sheet, means for cracking off the edge of the sheet comprising a roll above the sheet engaging the edge of the sheet outward from the line of scoring, and means adapted to apply pressure continuously thereon sufficient to cause the glass to crack along the line of scoring, the runway roller in opposition to said roll being beveled from the line of scoring outward so as to leave the edge of the sheet unsupported.

CLARENCE F. BURDETT.
WILLIAM OWEN.